(12) United States Patent
Montgomery

(10) Patent No.: US 9,767,511 B2
(45) Date of Patent: Sep. 19, 2017

(54) BIDDER-SIDE AUCTION DYNAMIC PRICING AGENT, SYSTEM, METHOD AND COMPUTER PROGRAM PRODUCT

(75) Inventor: Rob R. Montgomery, Gaithersburg, MD (US)

(73) Assignee: Life Proxy LLC, Bethesda, MD (US)

( * ) Notice: Subject to any disclaimer, the term of this patent is extended or adjusted under 35 U.S.C. 154(b) by 94 days.

(21) Appl. No.: 13/467,964

(22) Filed: May 9, 2012

(65) Prior Publication Data

US 2012/0226577 A1    Sep. 6, 2012

Related U.S. Application Data

(62) Division of application No. 12/185,589, filed on Aug. 4, 2008, now Pat. No. 8,204,819, which is a division of application No. 09/963,742, filed on Sep. 27, 2001, now Pat. No. 7,461,024.

(60) Provisional application No. 60/235,548, filed on Sep. 27, 2000.

(51) Int. Cl.
  *G06Q 40/04* (2012.01)
  *G06Q 30/08* (2012.01)

(52) U.S. Cl.
  CPC ............. *G06Q 30/08* (2013.01); *G06Q 40/04* (2013.01)

(58) Field of Classification Search
  USPC ...................................... 705/37, 26.3, 26.62
  See application file for complete search history.

(56) References Cited

U.S. PATENT DOCUMENTS

| | | |
|---|---|---|
| 4,789,928 A | 12/1988 | Fujisaki |
| 5,191,410 A | 3/1993 | McCalley et al. |
| 5,247,347 A | 9/1993 | Litteral et al. |
| 5,440,623 A | 8/1995 | Moore et al. |
| 5,508,731 A | 4/1996 | Kohorn |
| 5,537,143 A | 7/1996 | Steingold et al. |
| 5,561,707 A | 10/1996 | Katz |
| 5,563,937 A | 10/1996 | Bruno et al. |
| 5,600,632 A | 2/1997 | Schulman |
| 5,740,240 A | 4/1998 | Jolissaint |
| 5,774,873 A | 6/1998 | Berent et al. |

(Continued)

FOREIGN PATENT DOCUMENTS

| | | |
|---|---|---|
| EP | 1 199 663 A2 | 4/2002 |
| WO | WO-2005/001597 A2 | 1/2005 |
| WO | WO-2005/073882 A1 | 8/2005 |

OTHER PUBLICATIONS

The Wall Street Journal, "When 'Snipers' Do Your Online Bidding for You," WSJ.com, Jan. 5, 2006, p. D3.

(Continued)

*Primary Examiner* — Olabode Akintola
(74) *Attorney, Agent, or Firm* — Garrett IP

(57) ABSTRACT

A system, method, and computer program product for automating an online auction service and bidder interacton including receiving a keyword searching based on the keyword product auctions of a plurality of auction sites; and may include using a search agent or a meta-search agent, and providing returned auctions, and may include presenting current status of product auctions. The method can monitor temporal progression of auctions, and can notify users of changes in status. A bid proxy can be activated as an auction nears completion placing bids until the auction is won or lost. In the event of a counter offer, a higher bid can be made.

36 Claims, 11 Drawing Sheets

(56) References Cited

U.S. PATENT DOCUMENTS

| | | | |
|---|---|---|---|
| 5,794,219 A | 8/1998 | Brown | |
| 5,818,914 A | 10/1998 | Fujisaki | |
| 5,835,896 A | 11/1998 | Fisher et al. | |
| 5,845,265 A | 12/1998 | Woolston | |
| 5,890,138 A | 3/1999 | Godin et al. | |
| 5,905,975 A | 5/1999 | Ausubel | |
| 6,012,045 A | 1/2000 | Barzilai et al. | |
| 6,058,417 A | 5/2000 | Hess et al. | |
| 6,085,176 A | 7/2000 | Woolston | |
| 6,161,099 A | 12/2000 | Harrington et al. | |
| 6,202,051 B1 * | 3/2001 | Woolston | G06Q 20/10 705/26.3 |
| 6,371,855 B1 | 4/2002 | Gavriloff | |
| 6,408,283 B1 | 6/2002 | Alaia et al. | |
| 6,415,269 B1 | 7/2002 | Dinwoodie | |
| 6,415,270 B1 | 7/2002 | Rackson et al. | |
| 6,496,855 B1 | 12/2002 | Hunt et al. | |
| 6,499,018 B1 | 12/2002 | Alaia et al. | |
| 6,520,409 B1 | 2/2003 | Mori et al. | |
| 6,549,904 B1 * | 4/2003 | Ortega | G06F 17/30899 |
| 6,598,028 B1 | 7/2003 | Sullivan et al. | |
| 6,665,649 B1 | 12/2003 | Megiddo | |
| 6,677,858 B1 | 1/2004 | Faris et al. | |
| 6,718,312 B1 | 4/2004 | McAfee et al. | |
| 6,813,612 B1 | 11/2004 | Rabenold et al. | |
| 6,839,690 B1 | 1/2005 | Foth et al. | |
| 6,871,190 B1 | 3/2005 | Seymour et al. | |
| 6,871,191 B1 | 3/2005 | Kinney, Jr. et al. | |
| 6,892,186 B1 * | 5/2005 | Preist | G06Q 40/04 705/26.3 |
| 6,963,854 B1 | 11/2005 | Boyd et al. | |
| 7,047,210 B1 | 5/2006 | Srinivasan | |
| 7,085,740 B1 | 8/2006 | Meyers | |
| 7,099,841 B1 | 8/2006 | Hall et al. | |
| 7,177,832 B1 | 2/2007 | Semret et al. | |
| 7,203,662 B2 | 4/2007 | Das et al. | |
| 7,219,080 B1 | 5/2007 | Wagoner et al. | |
| 7,289,967 B1 * | 10/2007 | Brader-Araje | G06Q 30/0625 705/26.3 |
| 7,328,185 B1 | 2/2008 | Gupta et al. | |
| 7,475,034 B2 | 1/2009 | Coyne et al. | |
| 7,729,975 B2 | 6/2010 | Ausubel et al. | |
| 7,895,087 B1 | 2/2011 | Gotlieb | |
| 2001/0034696 A1 | 10/2001 | McIntyre | |
| 2001/0034697 A1 | 10/2001 | Kaen | |
| 2001/0051910 A1 | 12/2001 | Snelgrove et al. | |
| 2001/0056396 A1 | 12/2001 | Goino | |
| 2002/0013763 A1 | 1/2002 | Harris | |
| 2002/0032729 A1 | 3/2002 | Erickson et al. | |
| 2002/0042769 A1 | 4/2002 | Gujral et al. | |
| 2002/0049664 A1 | 4/2002 | Hoffman et al. | |
| 2002/0062276 A1 | 5/2002 | Krueger et al. | |
| 2002/0069156 A1 | 6/2002 | Adam et al. | |
| 2002/0082971 A1 | 6/2002 | Le et al. | |
| 2002/0116320 A1 | 8/2002 | Nassiri | |
| 2002/0147675 A1 | 10/2002 | Das et al. | |
| 2003/0023499 A1 | 1/2003 | Das et al. | |
| 2003/0023538 A1 | 1/2003 | Das et al. | |
| 2003/0093357 A1 | 5/2003 | Guler et al. | |
| 2003/0126061 A1 | 7/2003 | Brett et al. | |
| 2003/0130927 A1 | 7/2003 | Kellam et al. | |
| 2003/0208408 A1 | 11/2003 | Garg et al. | |
| 2003/0229564 A1 | 12/2003 | Reddi et al. | |
| 2003/0233315 A1 | 12/2003 | Byde et al. | |
| 2004/0039680 A1 | 2/2004 | Horch et al. | |
| 2004/0044614 A1 | 3/2004 | Wagner | |
| 2004/0088241 A1 | 5/2004 | Rebane et al. | |
| 2004/0110552 A1 | 6/2004 | Del Prado | |
| 2004/0128224 A1 | 7/2004 | Dabney et al. | |
| 2005/0010520 A1 | 1/2005 | Dinwoodie | |
| 2005/0021444 A1 | 1/2005 | Bauer et al. | |
| 2005/0091140 A1 | 4/2005 | Sloan et al. | |
| 2005/0125331 A1 | 6/2005 | Dinwoodie | |
| 2005/0209952 A1 | 9/2005 | Takahashi et al. | |
| 2005/0228745 A1 | 10/2005 | McHale et al. | |
| 2005/0234798 A1 | 10/2005 | Du Preez et al. | |
| 2005/0240507 A1 | 10/2005 | Galen et al. | |
| 2005/0262009 A1 | 11/2005 | Han et al. | |
| 2006/0047568 A1 | 3/2006 | Eisenberg et al. | |
| 2006/0047572 A1 | 3/2006 | Moore et al. | |
| 2006/0074792 A1 | 4/2006 | Wagoner et al. | |
| 2006/0136322 A1 | 6/2006 | Barry et al. | |
| 2006/0136324 A1 | 6/2006 | Barry et al. | |
| 2006/0136325 A1 | 6/2006 | Barry et al. | |
| 2006/0206408 A1 | 9/2006 | Nassiri | |
| 2007/0055578 A1 | 3/2007 | Ashton | |
| 2007/0055606 A1 | 3/2007 | Ausubel et al. | |
| 2007/0299682 A1 | 12/2007 | Roth et al. | |
| 2011/0040612 A1 | 2/2011 | Simmons et al. | |

OTHER PUBLICATIONS

Search Report by M.E. Keller.

M. Miller, "The Complete Idiot's Guide to Online Auctions," Que, 1999, pp. 33-36, 133-134, 137, 143-147, 164-165, and 192-199.

* cited by examiner

BIDDER-SIDE AUCTION DYNAMIC PRICING AGENT, SYSTEM, METHOD AND COMPUTER PROGRAM PRODUCT

CROSS-REFERENCE TO RELATED APPLICATIONS

The present application is a Divisional of U.S. patent application Ser. No. 12/185,589, filed Aug. 4, 2008, which is a divisional of U.S. Non-Provisional patent application Ser. No. 09/963,742, filed Sep. 27, 2001, which claims the benefit of related U.S. Provisional Patent Application 60/235,548, filed Sep. 27, 2000 the contents of all of which are incorporated herein by reference in their entirety.

BACKGROUND OF THE INVENTION

Field of the Invention

The present invention is related generally to online auctions, and more particularly to buyer side bidding tools.

Related Art

One of the first widely popular website types facilitated by widespread user access to the Internet, is the online auction site. Online auctions, initially in the business to consumer (B2C) space, such as, e.g., EBAY, and Yahoo-!Auctions enable many consumer clients with a computer and an Internet Service provider (ISP) account, to participate as a buyer (i.e., bidder user, or member), or seller (or biddee) in an auction. With the advent of business to business (B2B) electronic commerce auction sites such as, e.g., Freemarkets, business buyers in a procurement department can similarly bid on, e.g., supplies, parts, and vendor equipment.

Conventionally, online auctions can occur 24 hours per day, seven days per week. Unfortunately, a bidder is not able to monitor the status of an auction continually. It is desirable that tools to automate the bidding process be made available to bidders. Unfortunately, auction sites also continually create countermeasures to make it difficult to automate bidding.

Conventional auctions include bidding rules and bidding parameters. Unfortunately, bidding rules and parameters can change from time to time.

Conventionally, tools designed to automate the bidding process for a bidder (i.e., on the buy side) have been standalone workstation software based and lack various desirable features. Unfortunately, as bidding rules and parameters change and counter measures are added, the standalone software based tools no longer work. Thus, it is desirable that an improved tool be provided that overcomes the shortcomings of conventional solutions.

SUMMARY OF THE INVENTION

The present invention is directed to a system, method and computer program product that automates many of the processes of the buyer-side of a dynamic pricing or auction pricing transaction executed on the Internet. An exemplary embodiment of the present invention is available from Argosy Omnimedia, Inc. of Rockville, Md. U.S.A. The technology developed and commercialized by Argosy, according to the present invention, includes, in an exemplary embodiment, any of several, advantageous, separate components that can be integrated into a convenient program agent that can track performance of a given auction and can conduct a bidding transaction on behalf of the buyer on a specific auction site or sites.

The Buyer can select the targeted auction and auctioned item (product) from a result list. The result list can be created by use of a meta search engine. One or more items, i.e., products, can then be selected from the result list to receive automated bids placed by the buyer's bidding proxy.

An exemplary embodiment of the present invention sets forth a system, method, and computer program product for automating an interaction between a buyer and an electronic, variable, dynamic pricing online auction service is provided. The method can include the steps of: a. receiving a registration of a buyer at an Internet, web-enabled, buyer bidding application site (site) by creating logon credentials that are used to authenticate and authorize the buyer's access to the site, a portfolio of the buyer, and account information of the buyer, wherein the logon credentials are provided by an independent 3rd party through a logon agent using at least one of proxied identification and digital certificates; b. receiving entered information about financial transaction instruments of the buyer, contact information including at least one of a telephone number, an email address, and a physical mail address, and product preferences into an auction profile of the buyer; c. receiving a search query from the buyer for a desired product from the product auctions of a plurality of auction sites including at least one of keywords, model identification, brand identification, synonyms, and unique identification, using at least one of a search agent and a meta-search agent, and providing returned auctions, including retrieving current status of the product auctions and presenting the current status to the buyer; receiving a selection of one or more of the returned auctions to store in the portfolio of the buyer for tracking by one or more scan agents and for bidding by one or more bid proxies; d. receiving selections of a plurality of product auctions of the returned auctions and placing the plurality of product auctions into the portfolio for use by a cascaded bid proxy; e. providing monitoring by the one or more scan agents of temporal progression of the plurality of product auctions, and notifying the Buyer via a messaging center of any changes in relevant aspects of the current status of any of the plurality of product auctions that would prevent an initial bid from being placed by the bid proxy; f. enabling activation of the one or more bid proxies as any completing auction that nears completion of the plurality of product auctions, to begin placing one or more bids until the completing auction is either won or lost by time of auction closing, including enabling interaction between the scan agent and the bid proxy to place the bid of the buyer as close to the time of auction closing as possible and to confirm in that a counter-offer has not out-bid a most recent bid of the Buyer; g. computing and executing another valid higher bid that is within the bid parameters, if the counter-offer has been made and accepted by the auction site that is higher than the most recent bid detected by the scan agent.

In one exemplary embodiment, the step (e) can include: 1. notifying the Buyer when a current price of a targeted auction exceeds programmed bid parameters of the bid proxy, comprising at least one of: a. examining with an internal scan agent, bid information stored in the portfolio of the Buyer; and b. sending information to the Buyer using at least one of wired and wireless messaging technologies including at least one of an email, a page, a text page, an instant message, and an other communication, if a programmed bid with invalid bid parameters or other important information is detected.

In one exemplary embodiment, the step (e) can include: 1. notifying the Buyer when an auction has been won using at least one of a bid proxy of the Buyer and a programmed bid, wherein information is sent to the Buyer using at least one of wired and wireless messaging technologies including at least one of an email, a text page, an instant message, a communication, and a hypertext link to bid information stored in the portfolio of the Buyer.

In one exemplary embodiment, the method can further include: h. managing at least one of payment instruments, payment devices, contact, and financial status, of the Buyer through an online, personalizable buyer profile account comprising: 1. presenting registration screens to the Buyer for the collection of contact information including at least one of an email, a physical mail address, a telephone number, a pager, and an alternative contact information, and financial instrument information; 2. creating an account information record in a database of the information and linking the account information record to any activated auction portfolios of the buyer; and 3. providing access for the Buyer to the account information record and modifying the account information record as needed subsequent to buyer authentication.

In one exemplary embodiment, the method can further include: h. accelerating the performance of a bid proxy by using network telemetry and statistical algorithms to improve the win probability of the bid, comprising: 1. testing, using a telemetry agent, the response time of an auction site to periodically ascertain temporal latency for various types of queries and commands; 2. optimizing balance between when to place an initial bid and keeping winning price as low as possible, using information on the response time obtained during response time testing, wherein response time information is stored in an updateable profile for each auction site and is used by the bid proxy, and wherein the telemetry information collected comprises a screen type, and a transaction type including at least one of a query for auction status and a bid command, and a time span from a query to a response.

In one exemplary embodiment, the method can further include: h. receiving one or more persistent search agents that are programmed, persistent and operative to search one or more auction sites for product auctions of a desired product and providing returned auctions that a bid proxy can execute using at least one of a directed programmed bid, and an algorithmically calculated bid, wherein the one or more persistent search agents periodically search a list of a plurality of auction sites for product auctions that correlate with preference information stored in the profile of a buyer, including: 1. creating entries by the Buyer for each kind of product of which the Buyer desires to be notified if a product containing this description becomes available for bidding on any and all auction sites; 2. periodically searching, using the one or more persistent search agents, search services of the plurality of auction sites to see if a matching product can be found in lists of products being auctioned; and 3. sending, to the Buyer, a link to a found product using the message center, if any matches are found; and i. receiving at least one of definitions of programmed bidding parameters of the directed programmed bid to the bid proxy, and authorization of the bid proxy to algorithmically compute a lowest market price based on reviewing prevailing market prices for similar products as determined by information stored in a data warehouse.

In one exemplary embodiment, the method can further include: h. storing product preferences of the Buyer for products, including preference information that can be used by at least one of a persistent search agent, and a bid proxy operating under at least one of directed programmed bidding, and algorithmically calculated bidding parameters.

In another exemplary embodiment of the present invention, a system, method and computer program product for automating a Buyer's online, electronic search agent of specific electronic auctions on a targeted auction site is set forth including: a. providing a programmable search agent, from a server, that searches auction catalogs of a plurality of auction sites and identifies correlations between product parameters of a Buyer that can be at least one of entered and stored, and can include at least one of keywords, product classifications, and price ranges, and products that are listed for sale through dynamic price competitive bidding using a number of electronic auction techniques including at least one of a Dutch, Yankee, and Reverse auction techniques.

In one exemplary embodiment, the method can further include a step: b. providing additional programmable search agents searching said plurality of auction sites simultaneously for one or more products; and c. returning a found set of said one or more products for further review and selection by a Buyer.

In yet another exemplary embodiment of the present invention, a system, method and computer program product for executing one or more programmed bid proxies that are controlled by bid parameters comprising the steps of: a. retrieving, using a scan agent, the current auction status within a time to auction close window (TACW) wherein said TACW spans a range of time beginning at a time calculated by subtracting an absolute time to start proxied bidding from an auction end time, and ending with a time of the auction end time, wherein the TACW defines a period of time when a scan agent and a bid proxy work in tandem to place as many bids as necessary to win an auction; b. determining, by a bid proxy, if parameters of the current auction status fall within a range of acceptable auction status parameters; c. computing, using the bid proxy, a next valid price by adding a minimum valid price increment to a current auction price to compute an offer price, if the current auction price is below a maximum price, using the parameters of the current auction status; d. activating a bid proxy, and placing a bid in accordance with an auction site specific protocol, if the offer price is below the maximum price in the acceptable auction status parameters, wherein the auction site specific protocol varies from site to site, and a basic protocol involves at least one of entering the offer price, and authenticating as the Buyer so the offer price can be correlated with an account of the Buyer on the auction site and entered on behalf of the Buyer; e. retrieving the current auction status, using the scan agent, to verify that a latest bid of the Buyer has been accepted by the auction site; f. repeating steps (b) through (e) until auction end, if the current auction status indicates that the offer price of the Buyer has been rejected or outbid by another bidder; and g. scanning the auction, at the auction end, to determine win/loss status of the auction and storing the win/loss status in portfolio of the Buyer for later reporting to the Buyer through a messaging system.

In one exemplary embodiment, the step (a) can include: 1. computing the TACW based on a value derived from a data warehouse of the site, wherein the value derived is computed based on a minimum absolute time that has been logged for prior successful auctions for a given auction site, wherein the minimum absolute time is a time till close (TTC) value; and 2. computing the TTC value using probability analysis and auction site telemetry information computed based on recent response times and network latencies as determined by the scan agent.

In another exemplary embodiment of the present invention, a system, method and computer program product for providing cascaded bidding including: a. executing a series of cascaded bids for an identical product in temporally sequential auctions according to a programmed set of bid parameters, wherein the bid parameters comprise at least one of the following types: a programmed bid value limit for one or more units of product; an algorithmically calculated bid value limit based on prevailing market prices for similar or identical products monitored by agents and stored in a data warehouse.

In another exemplary embodiment of the present invention, a system, method and computer program product for scanning online auctions using a scan agent, including: a. scanning web pages of a targeted auction site and extracting relevant auction status information including at least one of an open, a close, a maximum bid, a minimum valid bid, a last bidder, and other auction parameters and information using a scan agent that can be used to compute a valid Buyer bid, comprising: 1. retrieving one or more programmed bids, using a scan agent, from one or more portfolios of one or more buyers; 2. extracting auction site identification from programmed bid information; 3. activating the appropriate scan agent based on the auction site identification and domain information of an auction site; 4. retrieving using the scan agent the latest auction site characterization information available for that auction site; 5. retrieving, using the scan agent, auction information from the auction site by at least one of navigating auction information pages of the auction site, and through using an application programming interface (API) that enables programmatic retrieval of the auction information; 6. the current auction parameters are retrieved, analyzed and stored in entry for the auction in the portfolio of the Buyer; and 7. performing further analysis by at least one of one or more site agents and processes.

In one exemplary embodiment, the method can further include: b. scanning status pages of the auction site to track progress and status of a targeted auction prior auction close, the method comprising of the steps of: 1. scanning, using the scan agent, all portfolios of all Buyers for all active auctions in each of the individual portfolios of the Buyers; 2. scanning slowly of the auctions listed in the each of the individual portfolios is performed for those auctions with TTC values that exceed a slow/fast scan threshold (SFST) value, wherein a slow/fast scan window (SFSW) is computed by subtracting the SFST value from each individual auction end time; 3. evaluating auction status information from those auctions that are before the start of the SFSW to determine if the Buyer's bid parameters for a given auction are no longer valid, including messaging the reason for non-validity to the Buyer using the messaging system, if the bid parameters are no longer valid for a given auction; 4. changing status of programmed bid from slow scan to fast scan, if the scan agent determines that a given auction falls within the SFSW; 5. scanning more frequently a programmed bid in fast scan mode in order to determine the current response time or latency of the auction site based on prevailing network traffic conditions; and 6. transitioning the programmed bid into active bid mode, if a bid is within the TACW, and execution of a bid proxy programmed bid that is controlled by bid parameters can be performed.

In another exemplary embodiment, the method can further include: b. distributing one or more scan agents to distributed network nodes including at least one of a server, a workstation, and a peer device) and executing the scanning process ("peer scan agent") from that node in response to high loading conditions on the master node or counter-measures enabled by the auction site, a method comprising the steps of: 1. distributing and activating on peer servers a copy of the agents involved in the bidding process, if at least one of the scan agent, and any other agent, detects the agent cannot access the auction site because the agent is not receiving a response to inquiries including at least one of a Post and a Get, wherein the peer servers are previously configured as support servers to the site and information about the peer servers is stored in a directory on a master node at the site; 2. distributing, by the master node, bid proxies of auctions from the portfolio of the Buyer and bid parameters to the designated peer server now assigned the task of bidding on a given auction by the master node; 3. executing on the peer server the auction bid proxy as would the master node without control from the master node; and 4. returning to the master node subsequent to auction end, and logging into the portfolio, the resulting win/loss/failed status of the auction.

In one exemplary embodiment, the step (2) can include: i. distributing of the bid proxies to distributed network nodes including at least one of a server, a workstation, and a peer device, and executing a peer bid proxy process initiated from a node responsive to at least one of high loading conditions on another node, and counter-measures enacted by the auction site.

In another exemplary embodiment of the present invention, a system, method and computer program product for adapting to changes in auction site layout and relevant auction site information, including: a. adapting to changes within a plurality of web pages of an auction site and changes across the plurality of web pages, so that one or more scan agents and one or more bid proxies intelligently adapt to format and data type changes in the web pages of the auction site including: 1. alerting by the scan agent of an intelligent process known as the information extractor when old information that is expected to be found on a new page is not found; 2. examining a new page layout by the information extractor and comparing the new page layout data to a stored copy of the old page layout of a known navigable page to determine if the old information is located elsewhere on the new page; 3. modifying the parameters of the scan agent by the information extractor to identify where the old information is now located on the new page, if the old information is found in another location in the new page layout than it was in the old page layout; 4. stepping through one or more previous pages in navigation of pages of the auction site, by the information extractor, and scanning new links to see if the old information has been moved to another page, if the old information is not found in the new page layout; 5. modifying parameters of the scan agent, by the information extractor, to identify the new location of the old information, if the old information is found; and 6. sending an alert to an administrator for the page and resulting navigation path to be retrained by the administrator using at least one of a neural net engine controlling the scan agent and another intelligent engine reprogramming mechanism, if the old information is not found.

In another exemplary embodiment of the present invention, a system, method and computer program product comprising a system comprising a processor and memory and any other computer peripheral components well known to the art, can be used to embody a machine having modules each operative to perform functions analogous to the steps of the disclosed methods.

Further, it is important to note that a computer program product can be provided executable on a computing system further including a removable storage medium that can embody program logic that can include computer readable code means for enabling the computer to provide functions operatively analogous to those disclosed in the disclosed and initially claimed methods as would be apparent to those skilled in the relevant art.

Further features and advantages of the invention, as well as the structure and operation of various exemplary embodiments of the invention, are described in detail below with reference to the accompanying drawings. In the drawings, like reference numbers generally indicate identical, functionally similar, and/or structurally similar elements. The drawing in which an element first appears is indicated by the leftmost digits in the corresponding reference number.

BRIEF DESCRIPTION OF THE DRAWINGS

The foregoing and other features and advantages of the invention will be apparent from the following, more particular description of an exemplary embodiment of the invention, as illustrated in the accompanying drawings.

DETAILED DESCRIPTION OF AN EXEMPLARY EMBODIMENT

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

The present invention is directed to a system, method and computer program product including several inter-working components that are designed to provide a convenient, programmable product for selecting targeted products on dynamic pricing or auction sites, entering the bidding parameters and then allowing the software driven, server based agent to proxy the buyer's bidding transactions in order to win an auction on a given product or products at the lowest possible price with minimal manual intervention on the part of the buyer user.

The components of the invention can include, in an exemplary embodiment:
AgentProxy Main Site Page;
Cascaded Bid;
Meta-Search Engine;
Meta-Registration Engine;
MyBid Portfolio;
MyAccount;
Bid Engine;
FastScan Bid Engine;
Proxied Peer-to-Peer Distributed Server Bid Engine; and
Maximum Bid Monitoring Process.

Each component is described below with reference to the attached FIGS. 1-11. A buyer or buyer user is another term for a member regardless of whether a subscription or transaction fee is charged or not.

Figure 1:
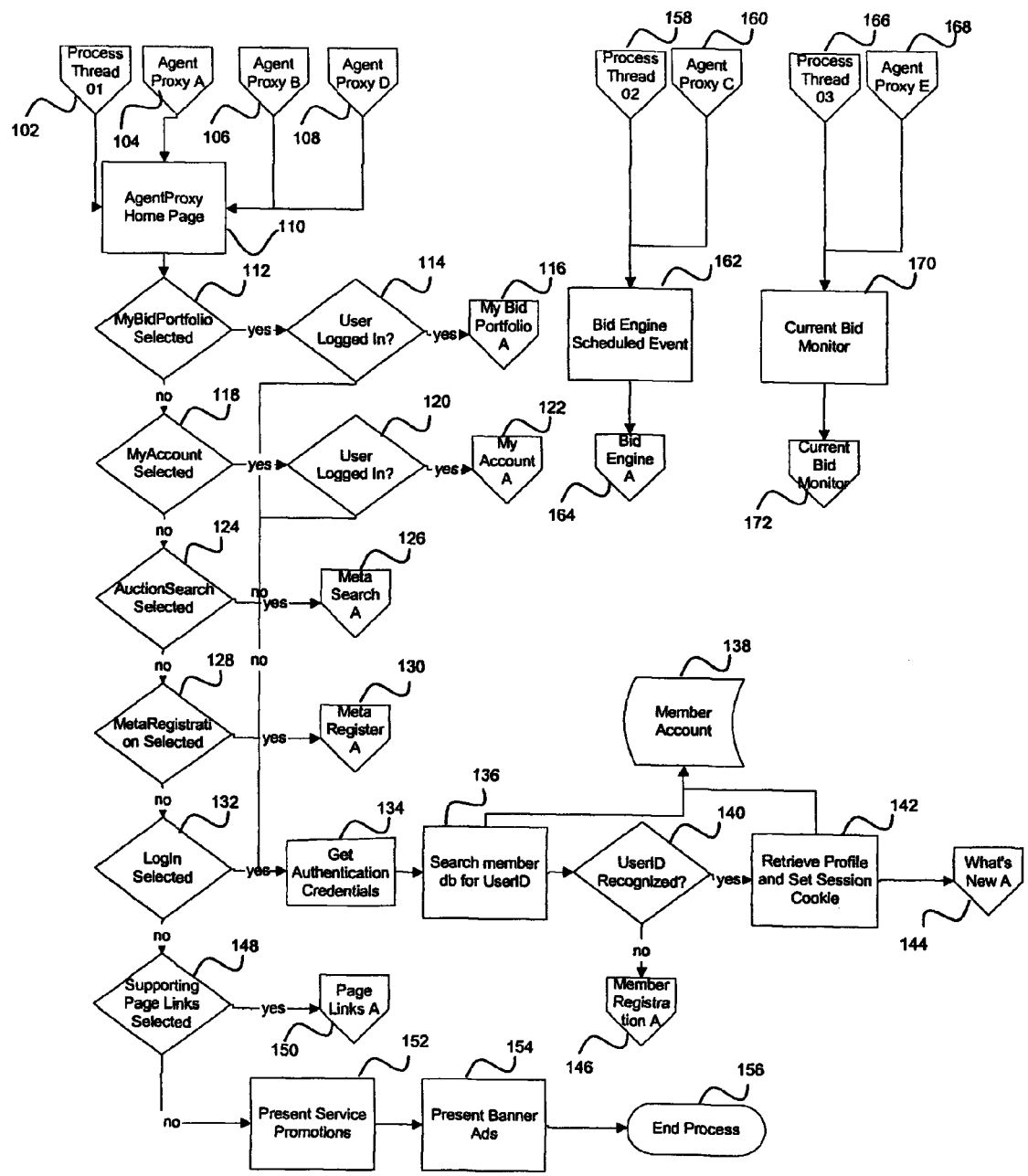
FIG. 1 depicts an exemplary embodiment of a flow diagram illustrating an AgentProxy main web site page that can provide a central aggregation and launch point for the service according to the present invention.

FIG. 1 depicts an exemplary embodiment of a flow diagram 100 illustrating an AgentProxy main web site page that can provide a central aggregation and launch point for the service. The page can provide links to the services or components within the site and can provide access to the authentication and authorization service that can identify a user as a registered member or can provide a link to a registration page where a user can become a registered member by, e.g., entering contact information, preferences and profile information into the AgentProxy site.

Specifically, flow diagram 100 depicts process thread 102, agent proxy 104, agent proxy 106 and AgentProxy homepage 110. Further depicted are process thread 158, agent proxy 160, and bid engine scheduled event 162 leading to bid engine 164. Further depicted are process thread 166, agent proxy 168, and current bid monitor 170 leading to current bid monitor 172.

From the AgentProxy homepage 110, decision step 112 determines whether my bid portfolio is selected. If yes, decision step 114 determines whether the user is logged in. If the user is logged in, flow proceeds to my bid portfolio 116. If the user is not logged in at step 114, authentication credentials are obtained in step 134. Then the member database is searched for the user ID in step 136. Using information obtained from stored member account 138, decision step 140 determines whether the user ID is recognized. If user ID is not recognized, flow proceeds to member registration step 146. If user ID is recognized, the profile is retrieved and the cookie session is set in step 142. Flow then proceeds to What's New 144.

If my bid portfolio in step 112 is not selected, decision step 118 determines if my account is selected. If yes, decision step 120 determines whether the user is logged in. If the user is logged in, flow proceeds to my account 122. If the user is not logged in in step 120, flow proceeds to get authentication credentials step 134 as described above.

If my account in step 118 is not selected, decision step 124 determines if auction search is selected. If yes, flow proceeds to meta-search 126. If no, decision step 128 determines if meta-registration is selected. If yes, flow proceeds to meta-register 130. If no, decision step 132 determines whether Login is selected. If yes, flow proceeds to get authentication credentials step 134 as described above. If no, decision step 148 determines if supporting page links is selected. If yes, flow proceeds to page links 150. If no, service promotions are presented in step 152. Next, banner ads are presented in step 154. The process ends at step 156.

Figure 2:
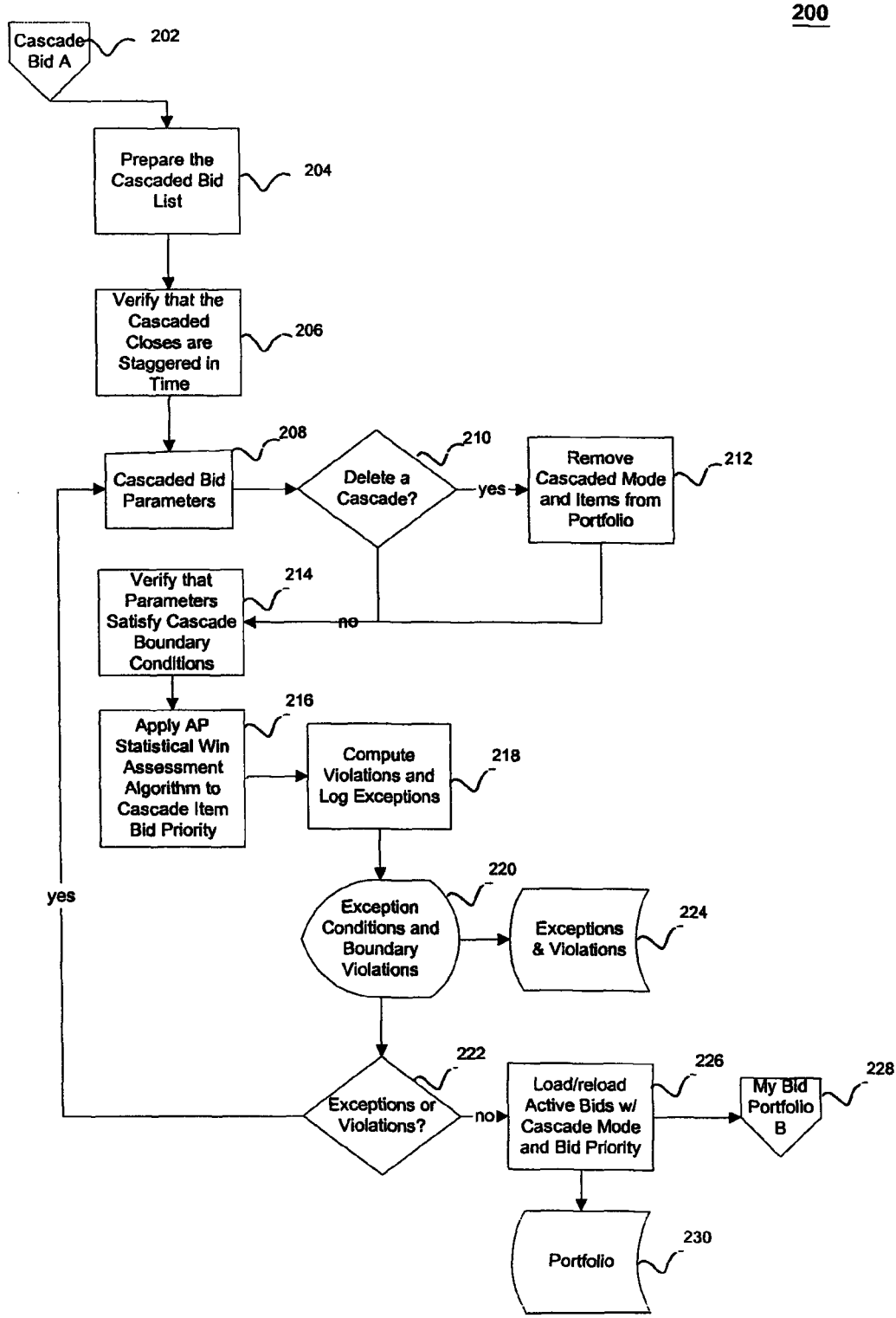
FIG. 2 depicts an exemplary embodiment of a flow diagram illustrating a Cascaded Bid service that can enable the buyer to select multiple auctions for the same or several different items and can enter them into a linked, bid cascade according to the present invention.

FIG. 2 depicts an exemplary embodiment of a flow diagram 200 illustrating a cascaded bid service that can enable the buyer to select multiple auctions for the same or several different items and can enter them into a linked, bid cascade ("cascade"). The cascade can be a list of auctions that close at different times. The cascaded bid of FIG. 2 can service and can track the proxied bidding of each item in a cascade. The bid parameters and prioritization of bid placements can be a function of the sequentially temporal nature of the auction close events and the application of statistical algorithms can evaluate win probability based on, e.g., current price, time to auction close and relative differential price as a function of, e.g., the average market price for the same or similar item. As bids on cascaded auctions are sequentially executed, the cascade can continue to proxy bids until one auction in the cascade is won. Once an auction in the cascade is won, in an exemplary embodiment, all subsequent auctions can be cancelled.

Specifically, flow diagram 200 depicts a flow proceeding from cascade bid 202. In step 204, the cascaded bid list is prepared. Next, in step 206, it is verified that the cascaded closes are staggered in time. Then cascaded bid parameters 208 are checked to determine, in step 210, whether a cascade is to be deleted. If a cascade is deleted, the cascaded mode is removed, along with items from the portfolio, in step 212. Then, if a cascade is not deleted, and after cascaded mode and portfolio items are removed, it is verified that the parameters satisfy cascade boundary conditions in step 214. Then, the AP statistical win assessment algorithm is applied to the cascade item bid priority in step 216. Violations and log exceptions are computed next in step 218. The exception conditions and boundary violations are displayed in step 220 and are stored in step 224. Decision step 222 determines whether there are exception or violations. If yes, flow proceeds back to checking cascaded bid parameters 208 for deletion in step 210. If no, then the active bids are loaded or reloaded with cascade mode and bid priority in step 226 and are stored as portfolio 230. Finally, flow proceeds to bid portfolio 228.

Figure 3:
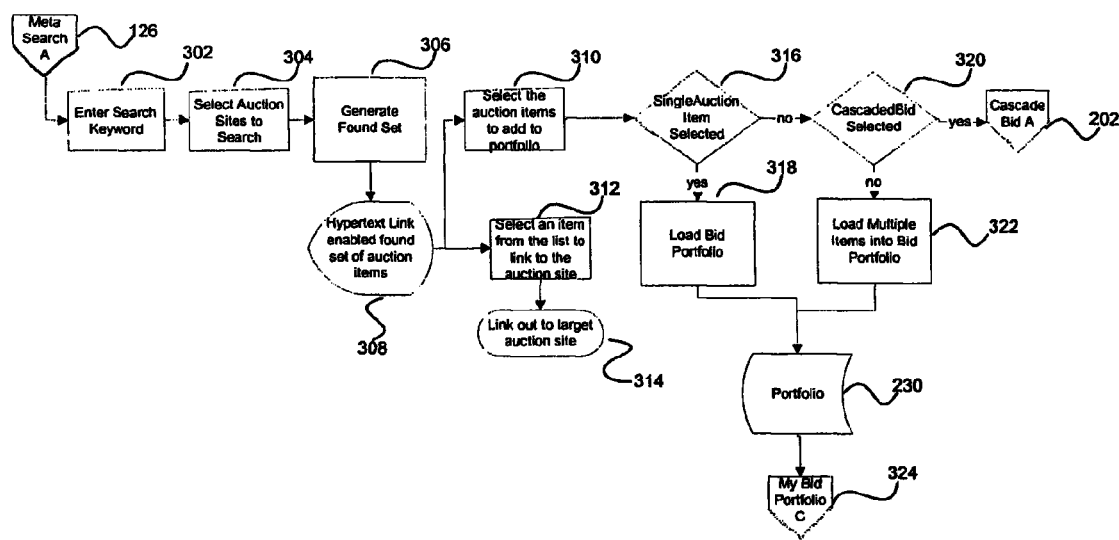
FIG. 3 depicts an exemplary embodiment of a flow diagram illustrating a meta-search engine component that can provide a convenient way for the buyer to search multiple auction sites and aggregate the results into a single, sortable result set according to the present invention.

FIG. 3 depicts an exemplary embodiment of a flow diagram 300 illustrating a meta-search engine component that can provide a convenient way for the buyer to search multiple auction sites and aggregate the results into a single, sortable result set. The buyer can enter in parameters such as the brand name or the model number of a particular item. The meta-search engine can then proxy this request to the various auction site specific search engines. The results can then be aggregated, sorted and displayed to the user as one integrated result list identifying which auction site is conducting auctions for each item. The buyer can then click on a particular item's identification code or description in order to link to the auction site to obtain more information on the item prior to entering it into the Bid Portfolio of the buyer user.

Specifically, flow diagram 300 depicts meta-search 126 where a keyword search is entered in step 302. Then auction sites to be searched are selected in step 304. After the search, a found set is generated in step 306. The hypertext-link enabled found set or auction items resulting from the search are displayed in step 308. The found set can be used to select an item from the list to link to the auction's site in step 312. Selecting an item in step 312 leads to the target auction site in step 314. Alternatively, the hypertext-link enabled list of found items 308 can be used to select auction items to add to a portfolio in step 310. Decision step 316 determines whether a single auction item is selected. If no, decision step 320 determines if a cascade bid is selected. If a cascade bid is selected, flow proceeds to cascade bid 202. If not, the multiple auction items are loaded into a bid portfolio 230 in step 322. If a single auction item is selected in step 316, then the bid portfolio 230 is loaded in step 318. Then flow proceeds to bid portfolio 324.

Figure 4:
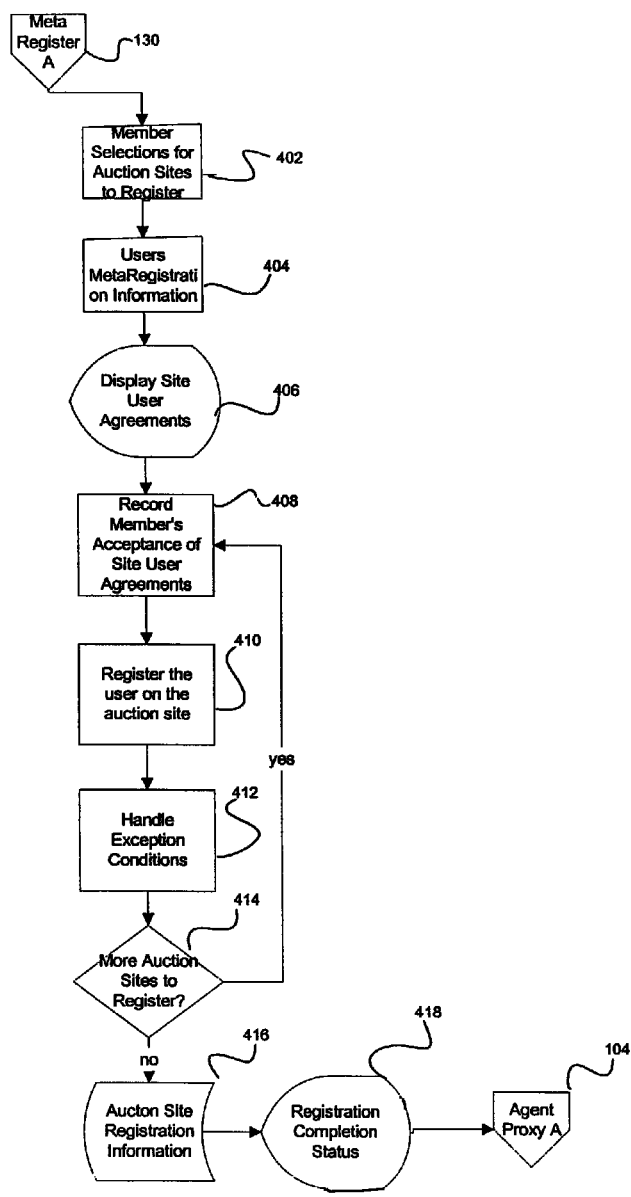
FIG. 4 depicts an exemplary embodiment of a flow diagram illustrating a meta-registration engine component that can provide a convenient, centralized service that can create registration accounts for the buyer on each of the dynamic pricing or auction sites that are tracked by the product according to the present invention.

FIG. 4 depicts an exemplary embodiment of a flow diagram 400 illustrating a meta-registration engine component that can provide a convenient, centralized service that can create registration accounts for the buyer on each of the dynamic pricing or auction sites that are tracked by the product. The meta-registration engine component can collect a super-set of the information necessary to register on all of the sites and then can programmatically navigate through the registration process of each site as the agent of the buyer and can enter the necessary information into each one of the auction sites. Any exception conditions can be logged and displayed to the buyer. The buyer can then resolve any of these exception conditions manually or programmatically as needed.

Specifically, flow diagram 400 depicts the meta-register 130. Using the inputs of member selections for auction sites to register 402 and the user's meta-registration information 404, site user agreements are displayed in step 406. Then, the user's acceptance of the site user agreements is recorded in step 408. The user is next registered on the auction site in step 410. Any exception conditions are handled in step 412. If there are more auction sites to register in step 414, the flow repeats starting from step 408. If there are no more auction sites to register, the auction site registration information is stored in step 416. The registration complete status is displayed in step 418. Then flow proceeds to agent proxy 104.

Figure 5:
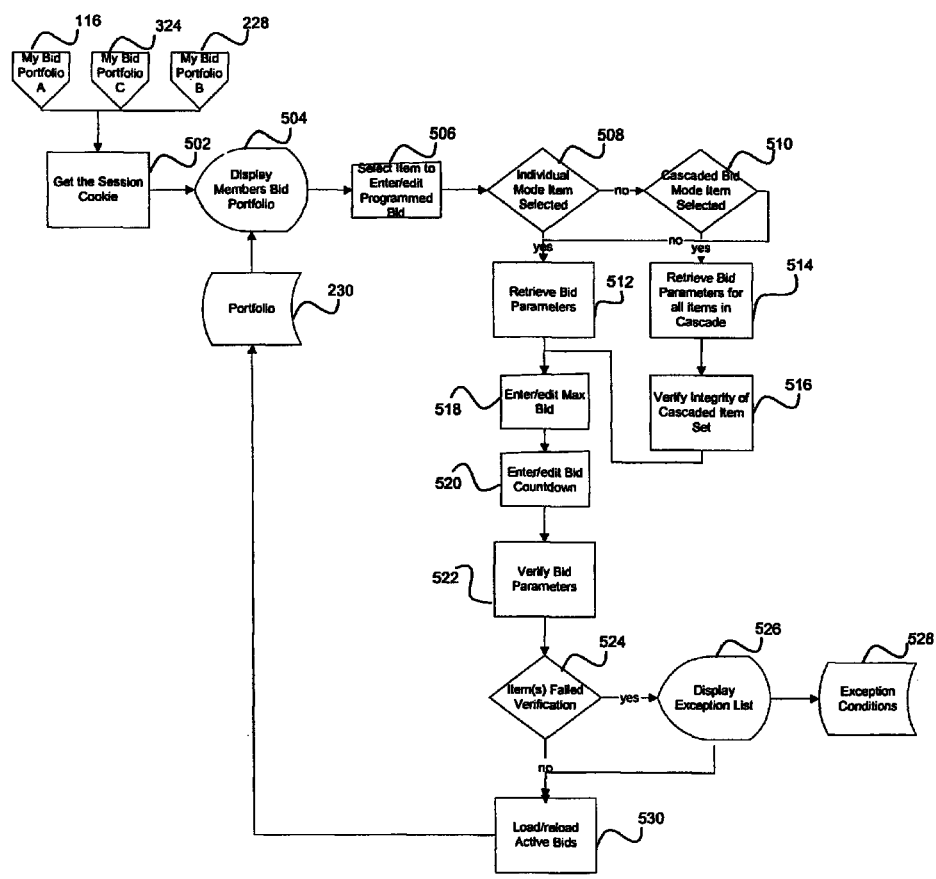
FIG. 5 depicts an exemplary embodiment of a flow diagram illustrating a mybid portfolio that can provide a centralized area where active bids of the buyer can be stored and displayed according to the present invention.

FIG. 5 depicts an exemplary embodiment of a flow diagram 500 illustrating a MyBid portfolio that can provide a centralized area where the buyer's active bids can be stored and displayed. The buyer can enter bid automation parameters into each bid's record by, e.g., clicking on the auctioned item's informational record, or updating the information directly on the portfolio summary page. The buyer can also edit and modify parameters on active bids by increasing or decreasing maximum bids, time to close activation and other bid or item related parameters. The buyer can also delete items in the portfolio regardless of whether bids have already been placed or not.

Specifically, flow diagram 500, depicts getting a session cookie for one or more my bid portfolios 116, 324, 228 in step 502. Then the member's bid portfolio is displayed in step 504. Next, an item is selected on which to enter or edit a programmed bid, in step 506. If individual mode is selected in step 508, or if neither individual mode nor a cascaded bid mode item in step 510 is selected, bid parameters are retrieved in step 512. If individual mode is not selected but there is a cascaded bid mode item selected, then bid parameters for all items in the cascade are retrieved in step 514. Step 514 is followed by step 516 where the integrity of the cascaded item set is verified. Then steps 512 and 516 both proceed to step 518, where the maximum bid is entered or edited. Next, the bid countdown is entered or edited in step 520. Bid parameters are verified in step 522. If the bid items fail verification in step 524, the exception list is displayed in step 526, and the exception conditions are stored in step 528. If the items are verified, the active bids are loaded or reloaded in step 530. The portfolio is stored in step 230, and is redisplayed in step 504, where the process repeats.

Figure 6:
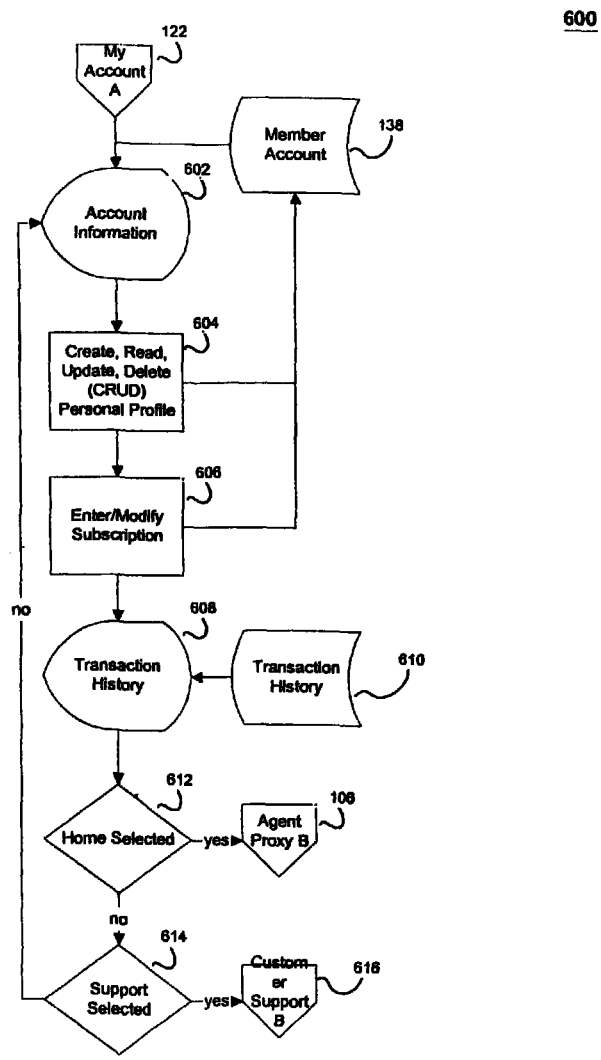
FIG. 6 depicts an exemplary embodiment of a flow diagram illustrating a myaccount component that can provide a convenient area for the buyer where the buyer can manage information pertaining to the account of the buyer, according to the present invention.

FIG. 6 depicts an exemplary embodiment of a flow diagram 600 illustrating a MyAccount component that can provide a convenient area for the buyer where the buyer can manage information pertaining to the account of the buyer. Subscription levels can be modified or selected in the MyAccount component. The buyer can also update preferences and profile information such as contact email address. Links to bid history on earlier auctions as well as current auctions can also be accessed through the MyAccount area.

Specifically, flow diagram 600 shows that information from stored member account 138 is displayed in step 602. Then, the personal profile is created, read, updated or deleted in step 604. The resulting modifications are again stored in member account 138. A subscription is then modified or entered in step 606, and the subscription is also stored in member account 138. The current transaction history, along with transaction history stored in 610 are then displayed in step 608. Next, if home is selected in step 612, flow proceeds to agent proxy 106. Otherwise, if support is selected in step 614, flow proceeds to customer support 616. If support is not selected, the account information is redisplayed at step 602 and the process repeats from there.

Figure 7:
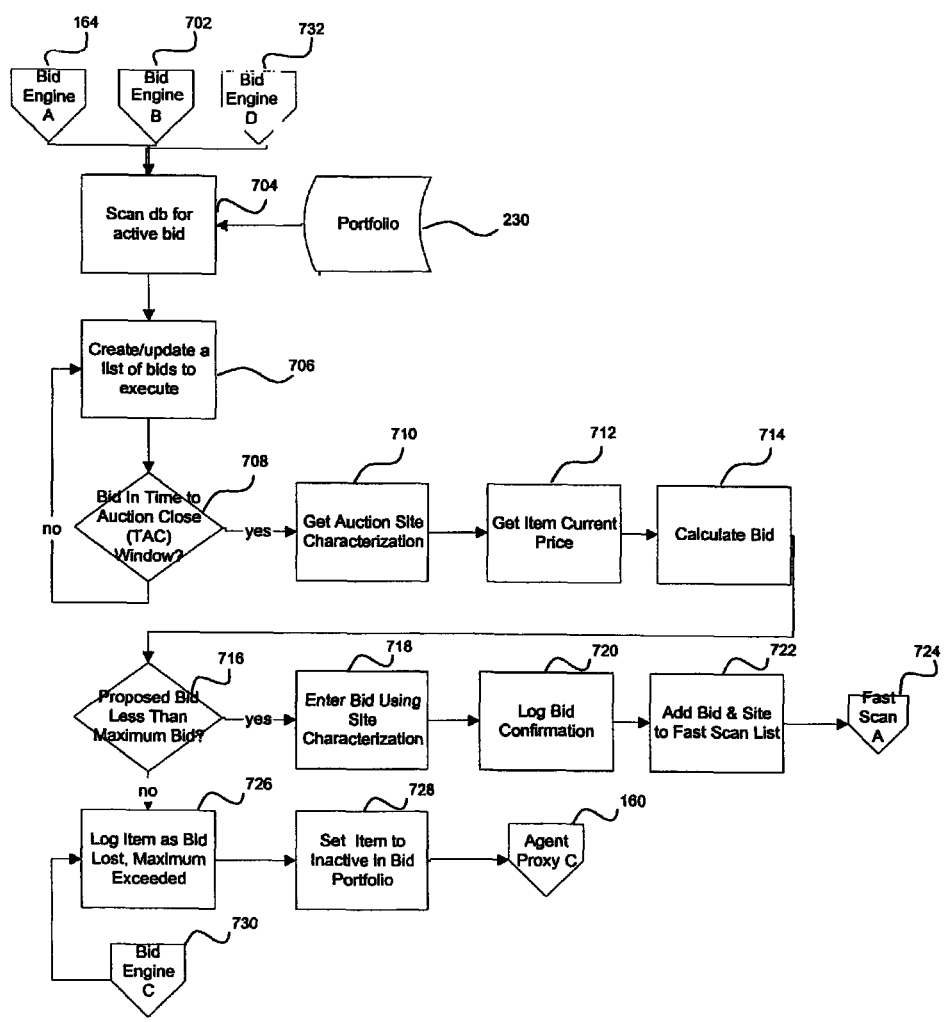
FIG. 7 depicts an exemplary embodiment of a flow diagram illustrating a bid engine component that can include bid automation business process logic that can manage the agent and proxy functionality, according to the present invention.

FIG. 7 depicts an exemplary embodiment of a flow diagram 700 illustrating a bid engine component that can include bid automation business process logic that can manage the agent and proxy functionality. The bid engine can scan the active bids for all buyers and can determine which bids are ready to execute based on their time to close activation parameter. The bid engine can then scan the targeted auction site to determine the current high bid and bidder. If the bidder is not the buyer, then the bid engine can prepare a bid based on computing the minimum incremental amount plus the current bid. If the computed bid is below the maximum bid parameter set by the buyer, then the engine can turn over the bid to the fastscan bid engine for processing. The bid engine can retrieve the Site Characterization information so that the fastscan bid engine can know how to navigate the site in order to execute the bid on behalf of the buyer. The bid engine can also retrieve all relevant buyer information for this account so that the proxied bid can be entered under the account of the buyer.

Specifically, flow diagram 700 shows that for any bid engine 164, 702, 732, the database is scanned for an active bid in step 704 using stored portfolio 230. Then the list of bids to execute is created or updated in step 706. If the bid is not within the time to auction close (TAC) window in step 708, the list of bids to execute is updated in step 706. Otherwise, the auction site characterization is obtained in step 710. Next the item's current price is obtained in step 712. The bid is calculated then in step 714. If the proposed bid is less than the maximum bid in step 716, then a bid is entered in step 718 using the site characterization. The bid confirmation is logged in step 720. The bid and the auction site are added to the fast scan list in step 722 and flow proceeds to fast scan 724. If the proposed bid exceeds the maximum bid in step 716, the item is logged as a lost bid in step 726. The item is then set to inactive in the bid portfolio in step 728 and flow proceeds to agent proxy 160. Alternatively, flow from bid engine 730 can proceed to step 726.

Figure 8:
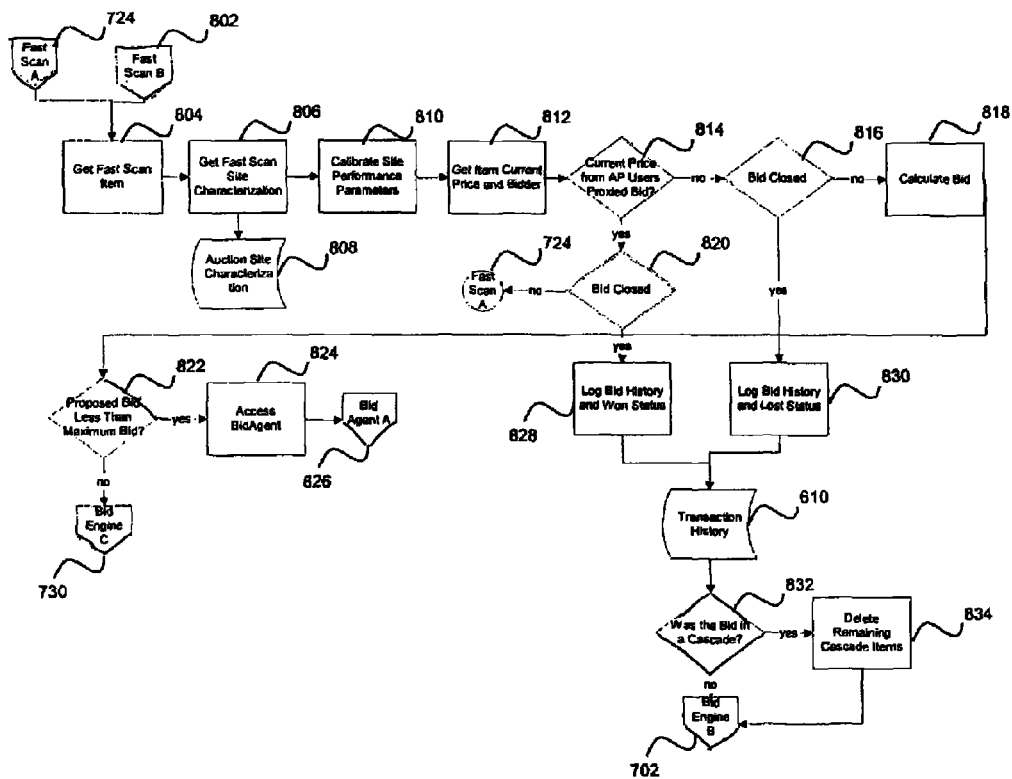
FIG. 8 depicts an exemplary embodiment of a flow diagram illustrating a fastscan bid engine component that can be designed to take advantage of "thread pool," software component based run-time architectures, according to the present invention.

FIG. 8 depicts an exemplary embodiment of a flow diagram 800 illustrating a fast scan bid engine component that can be designed to take advantage of a "thread pool," software component based run-time architecture. Once a bid object is turned over to the fast scan bid engine, the object can persist in fast access random access memory (DRAM) until the bid closes or until a later time if the close time is delayed as a counter-measure response. Site Characterization information can include, e.g., the data set that can define the unique navigational model, keywords, and name/value pairs that can describe to the Fast Scan and the Bid Agent how to inter-operate with the site in order to access the bid information and to emulate the buyer's interaction with the site as an agent for the buyer.

Specifically, flow diagram 800 shows flows proceeding to a fast scan 724 or 802 where first a fast scan item is obtained in step 804. Next in step 806, fast scan site characterization is obtained and auction site characterization is stored in step 808. Next, site performance parameters are calibrated in step 810. Then in step 812, the item's current price and bidder is obtained. If the current price is from AP users proxied bid, at decision step 814, and if the bid is not closed at step 820, flow proceeds to fast scan 724. If the bid is closed at step 820, then the bid history and win status are logged at step 828 and stored in a transaction history 610. If the current price is not from AP users proxied bid in step 814, and if the bid is closed at step 816, then the bid history and loss status are logged at step 830 and stored in a transaction history 610. After storing the transaction history, decision step 832 determines if the bid was in a cascade. If yes, the remaining cascade items are deleted in step 834. If not, then flow proceeds to bid engine 702.

If the bid is not closed at step 816, a bid is then calculated in step 818. If the proposed bid is less than the maximum bid, in step 822, the bid agent is accessed in step 824 and flow proceeds to bid agent 826. If the proposed bid is higher than the maximum bid, flow proceeds to bid engine 730.

Figure 9:
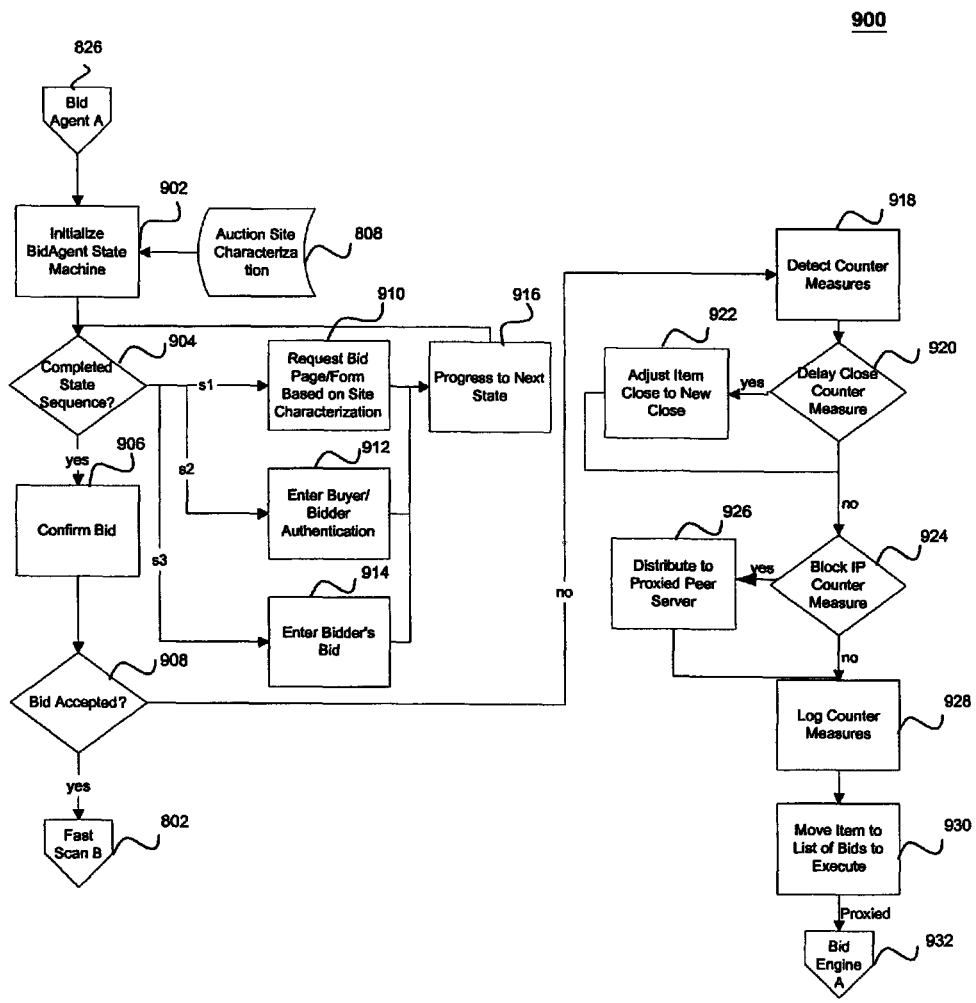
FIG. 9 depicts an exemplary embodiment of a flow diagram illustrating a bidagent component that can perform the actual bidding on behalf of the Buyer/Bidder, according to the present invention.

FIG. 9 depicts an exemplary embodiment of a flow diagram 900 illustrating a bid agent component that can perform the actual bidding on behalf of the buyer/bidder. The bid agent software can use information contained in the site characterization to emulate the interaction of the buyer/bidder. The bid agent can use the buyer's personal account information for the targeted auction site to authenticate, place and confirm bids that are automatically entered by the bid agent for the targeted auction. The bid agent can also use information contained in the auction site characterization data set to determine how to programmatically navigate the pages of the site, identify which information is expected to confirm receipt of the correct page and what information needs to be input for each page. The internal state machine can progress through each state as the bid is entered and any exception conditions can be logged and handled at each of these states. The design of the bid agent can also support distribution of a bid object to another server (see proxied peer-to-peer distributed server bid engine described further below with reference to FIG. 10) as a means of responding to an IP Block counter-measure and can also facilitate traffic management by load balancing the activated bid objects across a collection of federated or clustered servers. Bid agent can provide a counter-measure detection capability that can interpret specific kinds of response codes/pages and can then take actions to complete the bids through one of several alternatives such as, e.g., Time to Close Delay rescheduling and proxied server bid engine (see FIG. 10 below) responses.

Specifically, flow diagram 900 shows a bid agent state machine initialized at step 902 from a flow proceeding from bid agent 826. The initialization can include information from stored auction site characterization 808. If the state sequence is completed at step 904, the bid is then confirmed in step 906. If the bid is then accepted in step 908, flow proceeds to fast scan 802. If the state sequence is at state s1, a bid page/form is requested based on site characterization, at step 910. The state sequence then proceeds to the next state. If the state sequence is at state s2, the buyer/bidder authentication is entered at step 912. The state sequence then proceeds to the next state. In state s3, the bidder's bid is entered at step 914. The state sequence is then complete.

If the bid is not accepted at step 908, counter measures are detected in step 918. If a delay close counter measures is detected at step 920, the item close is adjusted to the new time in step 922. If delay counter measures are not detected, but block IP counter measures are detected in step 924, the bid is distributed to a proxied peer server in step 926. After these or other counter measures are detected, the counter measures are logged in step 928. Next, the item is moved to a list of bids to execute in step 930. Flow then proceeds to proxied bid engine 932.

Figure 10:
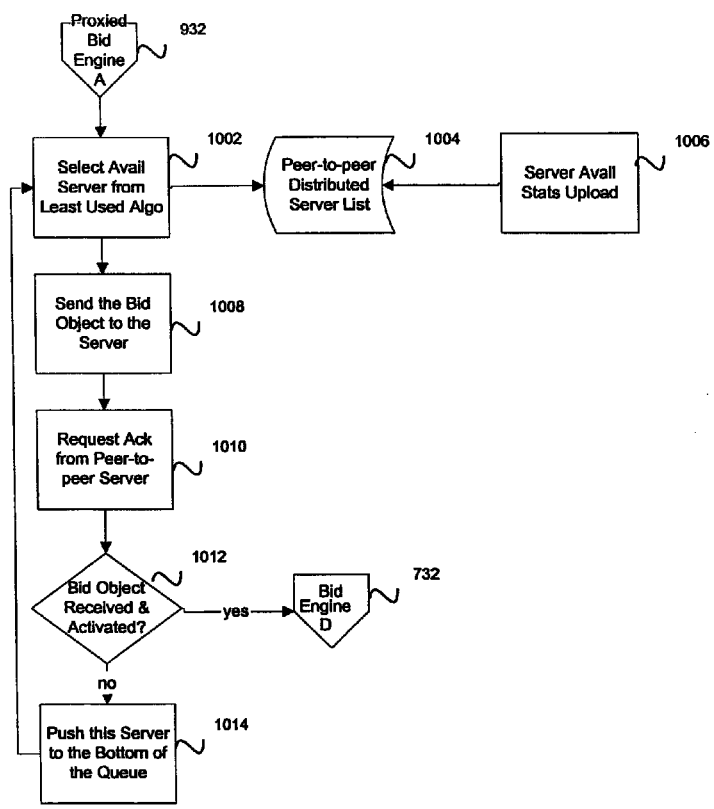
FIG. 10 depicts an exemplary embodiment of a flow diagram illustrating a proxied peer-to-peer distributed server bid engine of the present invention.

FIG. 10 depicts an exemplary embodiment of a flow diagram 1000 illustrating a proxied peer-to-peer distributed server bid engine component that can support the distributed processing of a collection of activated bid objects across, e.g., multiple, federated, peer-to-peer servers. The distribution of activated bid objects across these servers can be managed by a distributed and periodically updated list of least recently used servers (LRUS). If a bid object is passed to the local server's proxied server bid engine, then the proxied peer-to-peer distributed server bid engine component ("proxied server") process can look at a local copy of the LRUS table to select the most available, active server. A request can then be sent to this server to accept and process the bid object. The server can proactively acknowledge the receipt of this object or can respond to a request for confirmation after some time has expired. If a destination server denies receipt of the object, then the proxied server process can go to the next server on the list and can repeat the process until an acceptable server has been found.

From proxied bid engine 932, an available server is selected from the least used algorithm in step 1002. The peer-to-peer distributed server list is stored at step 1004. The list is also updated with an upload of available server statistics in step 1006. Next, the bid object is sent to the server at step 1008. In step 1010, an acknowledgement is requested from the peer-to-peer server. If the bid object is received and activated at step 1012, flow proceeds to bid engine 732. If not, the server is pushed to the bottom of the queue in step 1014. The process repeats starting at step 1002.

Figure 11:
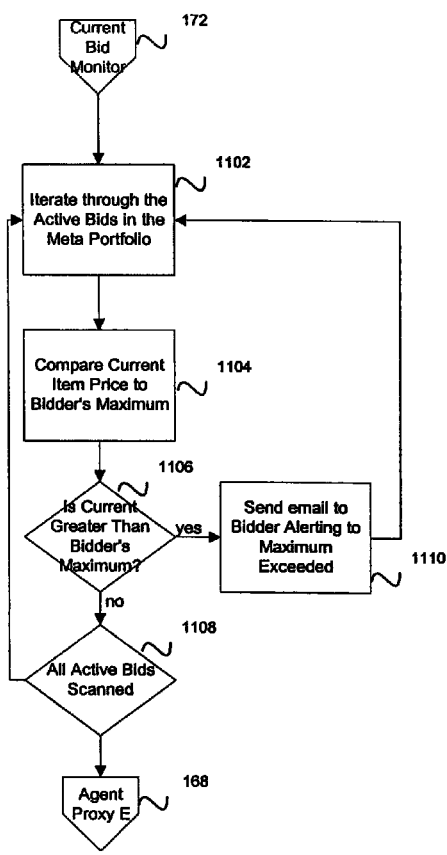
FIG. 11 depicts an exemplary embodiment of a flow diagram illustrating a monitoring process that tracks a maximum bid value.

FIG. 11 depicts an exemplary embodiment of a flow diagram 1100 illustrating a monitoring process that tracks the buyer/bidder's maximum value as compared to the current high bid for every activated bid object in the portfolio. In an exemplary embodiment, if the current bid is greater than the maximum bid value in the bid object, a notification can be sent via, e.g., email or through a wireless distribution system to alert the buyer/bidder of the fact that the maximum bid value of the buyer/bidder has been exceeded.

From a current bid monitor 172, the active bids in the meta-portfolio are iterated through starting at step 1102. Next, the current item price is compared to the bidder's maximum price in step 1104. If the current price is greater than the bidder's maximum at step 1006, an email is sent to the bidder alerting him that his maximum has been exceeded, in step 1110. If the current price is lower than the bidder's maximum, then if all active bids have been scanned in step 1108, flow proceeds to agent proxy 168. Otherwise, another iteration begins at step 1102.

A system comprising a processor and memory can be used to embody a machine having modules each operative to perform functions analogous to the steps of the disclosed methods.

Further, it is important to note that a computer program product can be provided executable on a computing system further including a removable storage medium that can embody program logic that can include computer readable code means for enabling the computer to provide functions operatively analogous to those disclosed in the disclosed and initially claimed methods as would be apparent to those skilled in the relevant art.

While various exemplary embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method, comprising:
   interfacing with each of multiple on-line auction sites, by a computer system, including navigating pages of the on-line auction sites and emulating user interactions with the on-line auction sites as an agent of a user based on navigation models of the respective on-line auction sites, and further including searching the on-line auction sites for auctions of items that satisfy a query of the user based on the respective navigation models, wherein the navigation models are based on characteristics of the respective on-line auction sites; and
   interfacing with the user, by the computer system, through a user interface, including receiving the query through the user interface and presenting results of the searching of each of the on-line auction sites through the user interface.

2. The method of claim 1, wherein the searching includes identifying an auction for an item on a first one of the on-line auction sites that satisfies the query, and wherein the interfacing with each of multiple on-line auction sites further includes:
   bidding for the item of the identified auction on behalf of the user through the first on-line auction site based on the respective navigation model, bidding rules of the first on-line auction site, bidding status of the identified auction, and a bidding parameter of the user.

3. The method of claim 2, further including:
   computing, by the computer system, a window of time that begins subsequent to a start time of the identified auction and ends at a scheduled end time of the identified auction; and delaying the bidding, by the computer system, until the window of time.

4. The method of claim 3, wherein the computing includes:
computing the window of time based on times of submission of winning bids of prior auctions of the first on-line auction site relative to end times of the respective prior auctions.

5. The method of claim 3, wherein the computing includes:
computing the window of time based on one or more of, a response time of the first on-line auction site, and network latency.

6. The method of claim 3, wherein the bidding includes computing an initial bid, the method further including, during the window of time:
submitting, by the computer system, input to the first on-line auction site, wherein the input includes one or more of a query and a command;
measuring, by the computer system, a response time of the first on-line auction site to the input; and
computing, by the computer system, a time within the window of time at which to submit the initial bid based at least in part on the measured response time of the first on-line auction site.

7. The method of claim 2, further including:
detecting, by the computer system, an automating-bidding counter-measure employed by the first on-line auction site; and
performing, by the computer system, one or more counter-counter-measures to overcome the counter-measure and continue the bidding.

8. The method of claim 7, wherein:
the bidding includes computing a time at which to submit a bid based on a scheduled closing time of the identified auction;
the detecting includes detecting a change to the scheduled closing time by the first on-line auction site; and
the performing includes re-computing the time at which to submit the bit based on the change to the scheduled closing time.

9. The method of claim 7, wherein the computer system includes a network of servers, and wherein:
the bidding includes initially performing the bidding on a first one of the servers;
the detecting includes detecting an IP block directed to the first server; and
the performing includes performing the bidding on one or more other ones of the servers subsequent to the detecting.

10. The method of claim 1, further including:
comparing, by the computer system, a current page of a first one of the on-line auction sites to a prior version of one or more pages of the first on-line auction site to detect a change in the current page of the first on-line auction site; and
modifying, by the computer system, the navigation model of the first on-line auction site to accommodate the change.

11. The method of claim 1, wherein the searching further includes identifying an auction for an item that satisfies the query, on each of a plurality of the on-line auction sites, and wherein the interfacing with each of multiple on-line auction sites further includes:
bidding for the items of the identified auctions on behalf of the user through the respective on-line auction sites based on the respective navigation models; and
halting the bidding with respect to all of the identified auctions if a bid submitted to any one of the auctions on behalf of the user is a winning bid of the respective auction.

12. The method of claim 1, further including collecting, by the computer system, a set of information related to the user, wherein the interfacing with each of multiple on-line auction sites further includes:
navigating through a registration process of each of the on-line auction sites to create a user account for the user with each of the on-line auction sites based on the set of information related to the user and the respective navigation models;
notifying the user if an exception occurs while creating a user account with any one or more of the on-line auction sites; and
logging into each of the user accounts on behalf of the user.

13. An apparatus, comprising a processor and memory configured to:
interface with each of multiple on-line auction sites, including to navigate pages of the on-line auction sites and emulate user interactions with the on-line auction sites as an agent of a user based on a-navigation models of the respective on-line auction sites, and further including to search the on-line auction sites for auctions of items that satisfy a query of the user based on the respective navigation models, wherein the navigation models are based on characteristics of the respective on-line auction sites; and
interface with the user through a user interface, including to receive the query through the user interface and to present results of the search of each of the on-line auction sites through the user interface.

14. The apparatus of claim 13, wherein the processor and memory are further configured to:
identify an auction for an item on a first one of the on-line auction sites that satisfies the query; and
bid for the item of the identified auction on behalf of the user through the first on-line auction site based on the respective navigation model, bidding rules of the first on-line auction site, bidding status of the identified auction, and a bidding parameter of the user.

15. The apparatus of claim 13, wherein the processor and memory are further configured to:
compute a window of time that begins subsequent to a start time of the identified auction and ends at a scheduled end time of the identified auction; and
delay an initial bid until the window of time.

16. The apparatus of claim 15, wherein the processor and memory are further configured to:
compute the window of time based on times of submission of winning bids of prior auctions of the first on-line auction site relative to end times of the respective prior auctions.

17. The apparatus of claim 15, wherein the processor and memory are further configured to:
compute the window of time based on one or more of, a response time of the first on-line auction site, and network latency.

18. The apparatus of claim 15, wherein the processor and memory are further configured to compute an initial bid, and to perform the following during the window of time:
submit input to the first on-line auction site, wherein the input includes one or more of a query and a command;
measure a response time of the first on-line auction site to the input; and compute a time within the window of time at which to submit the initial bid based at least in part on the measured response time of the first on-line auction site.

19. The apparatus of claim 14, wherein the processor and memory are further configured to:
detect an automating-bidding counter-measure employed by the first on-line auction site; and
perform one or more counter-counter-measures to overcome the counter-measure and continue the bidding.

20. The apparatus of claim 19, wherein the processor and memory are further configured to:
compute a time at which to submit a bid based on a scheduled closing time of the identified auction;
detect the automated-bidding counter-measure as a change to the scheduled closing time by the first on-line auction site; and
re-compute the time at which to submit the bit based on the change to the scheduled closing time.

21. The apparatus of claim 19, wherein the apparatus includes a network of servers configured to:
initially bid for the item of the identified auction on behalf of the user on a processor and memory of a first one of the servers;
detect the automated-bidding counter-measure as an IP block directed to the first server; and
bid for the item of the identified auction on behalf of the user on a processor and memory of one or more other ones of the servers subsequent to detection of the IP block.

22. The apparatus of claim 13, wherein the processor and memory are further configured to:
compare a current page of the first on-line auction site to a prior version of one or more pages of the first on-line auction site to detect a change in the current page of the first on-line auction site; and
modify the navigation model of the first on-line auction site to accommodate the change.

23. The apparatus of claim 13, wherein the processor and memory are further configured to:
identify an auction for an item that satisfies the query, on each of a plurality of the on-line auction sites;
bid for the items of the identified auctions on behalf of the user through the respective on-line auction sites based on the respective navigation models; and
halt bidding with respect to all of the identified auctions if a bid submitted to any one of the auctions on behalf of the user is a winning bid of the respective auction.

24. The apparatus of claim 13, wherein the processor and memory are further configured to:
collect a set of information related to the user;
navigate through a registration process of each of the on-line auction sites to create a user account for the user with each of the on-line auction sites based on the set of information related to the user and the respective navigation models;
notify the user if an exception occurs while creating a user account with any one or more of the on-line auction sites; and
log into the user accounts on behalf of the user.

25. A non-transitory computer readable medium encoded with a computer program that includes instructions to cause the processor to:
interface with each of multiple on-line auction sites, including to navigate pages of the on-line auction sites and emulate user interactions with the on-line auction sites as an agent of a user based on a-navigation model of the respective on-line auction sites, and further including to search the on-line auction sites for auctions of items that satisfy a query of the user based on the respective navigation models, wherein the navigation models are based on characteristics of the respective on-line auction sites; and
interface with the user through a user interface, including to receive the query through the user interface and to present results of the search of each of the on-line auction sites through the user interface.

26. The non-transitory computer readable medium of claim 25, wherein the processor and memory are further configured to:
identify an auction for an item on a first one of the on-line auction site that satisfies the query; and
bid for the item of the identified auction on behalf of the user through the first on-line auction site based on the respective navigation model, bidding rules of the first on-line auction site, bidding status of the identified auction, and a bidding parameter of the user.

27. The non-transitory computer readable medium of claim 26, wherein the processor and memory are further configured to:
compute a window of time that begins subsequent to a start time of the identified auction and ends at a scheduled end time of the identified auction; and
delay an initial bid until the window of time.

28. The non-transitory computer readable medium of claim 27, wherein the processor and memory are further configured to:
compute the window of time based on times of submission of winning bids of prior auctions of first the on-line auction site relative to end times of the respective prior auctions.

29. The non-transitory computer readable medium of claim 27, wherein the processor and memory are further configured to:
compute the window of time based on one or more of, a response time of the first on-line auction site, and network latency.

30. The non-transitory computer readable medium of claim 27, wherein the processor and memory are further configured to compute an initial bid, and to perform the following during the window of time:
submit input to the first on-line auction site, wherein the input includes one or more of a query and a command;
measure a response time of the first on-line auction site to the input; and
compute a time within the window of time at which to submit the initial bid based at least in part on the measured response time of first the on-line auction site.

31. The non-transitory computer readable medium of claim 26, wherein the processor and memory are further configured to:
detect an automating-bidding counter-measure employed by the first on-line auction site; and
perform one or more counter-counter-measures to overcome the counter-measure and continue the bidding.

32. The non-transitory computer readable medium of claim 31, wherein the processor and memory are further configured to:
compute a time at which to submit a bid based on a scheduled closing time of the identified auction;
detect the automated-bidding counter-measure as a change to the scheduled closing time by the first on-line auction site; and
re-compute the time at which to submit the bit based on the change to the scheduled closing time.

33. The non-transitory computer readable medium of claim 31, wherein the non-transitory computer readable medium includes a network of servers configured to:
  initially bid for the item of the identified auction on behalf of the user on a processor and memory of a first one of the servers;
  detect the automated-bidding counter-measure as an IP block directed to the first server; and
  bid for the item of the identified auction on behalf of the user on a processor and memory of one or more other ones of the servers subsequent to detection of the IP block.

34. The non-transitory computer readable medium of claim 25, wherein the processor and memory are further configured to:
  compare a current page of the first on-line auction site to a prior version of one or more pages of the first on-line auction site to detect a change in the current page of the on-line auction site; and
  modify the navigation model of the first on-line auction site to accommodate the change.

35. The non-transitory computer readable medium of claim 25, wherein the processor and memory are further configured to:
  identify an auction for an item that satisfies the query, on each of a plurality of the on-line auction sites;
  bid for the items of the identified auctions on behalf of the user through the respective on-line auction sites based on the respective navigation models; and
  halt bidding with respect to all of the identified auctions if a bid submitted to any one of the auctions on behalf of the user is a winning bid of the respective auction.

36. The non-transitory computer readable medium of claim 25, wherein the processor and memory are further configured to:
  collect a set of information related to the user;
  navigate through a registration process of each of the on-line auction sites to create a user account for the user with each of the on-line auction sites based on the set of information related to the user and the respective navigation models;
  notify the user if an exception occurs while creating a user account with any one or more of the on-line auction sites; and
  log into the user accounts on behalf of the user.

* * * * *